United States Patent [19]
Carboni

[11] 3,943,313
[45] Mar. 9, 1976

[54] AUTOMOTIVE DOOR ACCESSORY FOR TURNING OFFICE VEHICLE HEADLIGHT SWITCH

[76] Inventor: Aldo J. Carboni, 4642 W. El Segundo Blvd., Hawthorne, Calif. 90250

[22] Filed: Mar. 4, 1975

[21] Appl. No.: 555,291

[52] U.S. Cl. .............................. 200/61.62; 200/330
[51] Int. Cl.² .......................................... H01H 3/16
[58] Field of Search ....... 200/61.62, 61.58 R, 61.64, 200/61.67, 61.76, 61.79, 61.81, 329, 330, 153 T, 331; 180/111–113; 340/274 R, 280, 282

[56] References Cited
UNITED STATES PATENTS

| | | | |
|---|---|---|---|
| 3,002,581 | 10/1961 | Diebel et al. | 180/113 |
| 3,643,249 | 2/1972 | Haywood | 340/274 |

*Primary Examiner*—James R. Scott
*Attorney, Agent, or Firm*—Howard L. Johnson

[57] ABSTRACT

Two-piece assembly fixed to inner forward margin of driver's door of vehicle so as to position a horizontal support arm generally parallel to and spaced from auto dashboard, with a terminal abutment arm carried normally overlying the face of the pull knob of headlight pull-push switch-rod when retracted to its (OFF) position. Abutment arm is pivoted or spring-loaded for manual retraction to disengaged position which is automatically restored upon door opening, so that subsequent closing of door will cause abutment arm to axially contact outdrawn switch-rod and press it back to light-off position.

7 Claims, 10 Drawing Figures

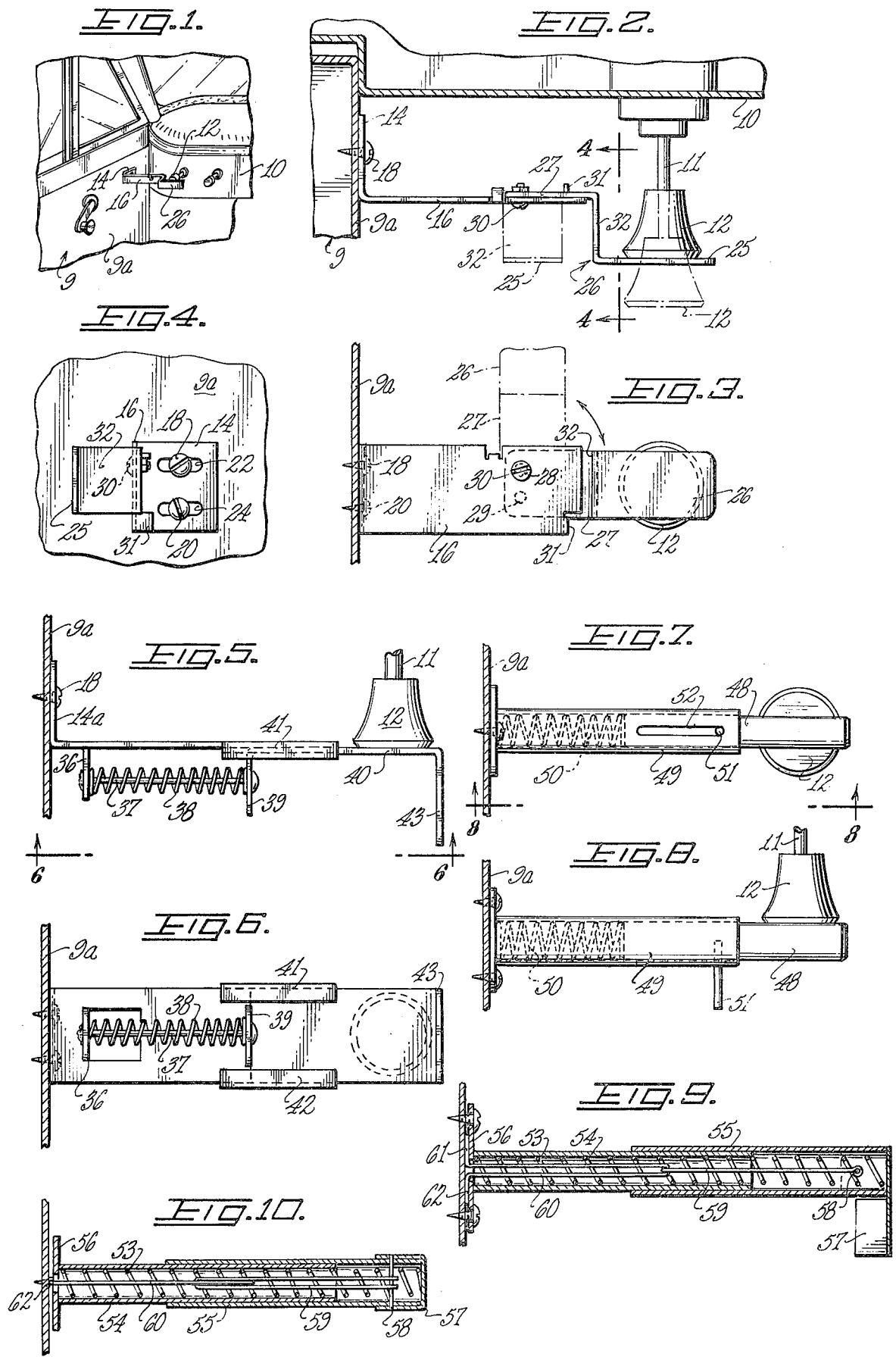

AUTOMOTIVE DOOR ACCESSORY FOR TURNING OFFICE VEHICLE HEADLIGHT SWITCH

BACKGROUND OF THE INVENTION

When parking a motor vehicle which has been operated with the headlights on, the operator may unintentionally leave without realizing that the lights remain lit, especially during conditions of fog or rain. If the auto continues to stand thus for an extended period of time, drain on the battery may make the motor subsequently difficult or impossible to start. Various devices have been suggested to deal with this problem by incorporating into the wiring system a cut-off switch which is triggered by some other operation, such as ignition turn-off, door closure, release of weight from driver's seat, etc. either with or without a time-delay element. However any installation into the vehicle electric system (after it leaves the manufacturer) is both expensive and usually requires expert knowledge; even so, the result at best is a more complicated wiring system which now includes another component which may fail unexpectedly.

Accordingly it is an object of the present invention to provide such a simple and entirely mechanical switch mechanism or assembly which is readily installed on any highway vehicle with use of a simple tool such as a screwdriver and without in any way connecting with or interfering with the electric circuitry or with the existing system of turning on and off the vehicle lights, such switch being mechanically operable merely by closing the driver's door and without requiring any conscious presetting of the switch mechanism.

BRIEF STATEMENT OF THE INVENTION

The invention provides a two-piece assembly which can be attached to the inner surface or upright panel of the operator's door of a vehicle or motor car. A fixed support arm extends from the attachment horizontally inward to spacedly overlie the dashboard and locate a terminal abutment arm in juxtaposition with the diametric face of the pull knob of a switch-rod which traverses the dashboard and serves to operate the vehicle lighting system by longitudinally reciprocable movement between two stop positions. The abutment arm is biased to normally occupy such position when the switch-rod is retracted to "lights off" position; but it is manually movable laterally therefrom to enable the driver to draw out the switch-rod when it is desired to turn on the lights. Retraction of the switch-rod or opening of the driver's door automatically restores the abutment arm to its biased position. Hence if the switch-rod is extended (the headlights on), closing the door causes the abutment arm to automatically impact the pull knob and retract the switch-rod (extinguishing the lights). The abutment arm may be spring-loaded and (telescopically) slidable lengthwise along the support arm; or it may be pivoted offcenter thereto so as to gravitationally drop to engagement position. In the latter form it may also be transversely offset so as to overlie a ridge of the dashboard or accommodate inexact alignment of the attachment tab along the door panel.

BRIEF DESCRIPTION OF THE DRAWINGS

FIG. 1 is a perspective view of a corner of the driver's compartment of a motor vehicle showing the present switch assembly attached to the inside surface of the door, with its free or inner end overlying the operation knob of a headlight, pull switch-rod extending through the dashboard of the vehicle.

FIG. 2 is a horizontal sectional view taken through adjacent fragments of the door and dashboard, the switch assembly in top plan with the upraised abutment arm and outdrawn pull knob appearing in phantom.

FIG. 3 is a face view of the switch assembly of FIG. 2.

FIG. 4 is a face view of the door fragment with the attached switch assembly as viewed in the direction of the arrows 4-4 of FIG. 2.

FIG. 5 is a top plan view of a modified construction in which the abutment arm is longitudinally slidable and spring loaded.

FIG. 6 is a face view of the construction of FIG. 5 as seen in the direction of the arrows of FIG. 5.

FIG. 7 is a face view of another modification employing telescopic tubes.

FIG. 8 is a top plan view of the modification of FIG. 7.

FIG. 9 is a longitudinal sectional view of another form of spring-loaded telescopic construction.

FIG. 10 is a sectional view of the same, rotated 90° along the longitudinal axis from the position of FIG. 9.

DESCRIPTION OF ILLUSTRATED EMBODIMENTS

In FIG. 1 is shown the driver's compartment of an automotive vehicle in which the dashboard or control panel 10 is traversed by a conventional switch-rod 11 having a terminal knob 12 by which the rod is reciprocably moved longitudinally between two stop positions at which it makes or breaks the electrical circuit through the body lights such as the headlights and usually including the rear lights as well. At the IN position the lights are off; at the OUT position they are on.

The present construction provides a generally falt, footing tab or plate 14 which is easily attached to the inner surface of the door 9 adjacent the foward upright margin, at an elevation similar to that of the pull knob 12 and generally in the same horizontal plane. A projecting support arm 16 is thus positioned generally parallel to the dashboard and spaced outward therefrom a small distance. Attachment of the footing tab 14 may be by means of a pair of screws 18, 20 inserted through adjustment slots 22, 24 (FIG. 4) into the door panel 9a (traversing such upholstery layer as may be present).

At the inner end of the support arm 16 is disposed a more-or-less Z-shaped contact or abutment arm 26 of somewhat less vertical height than the support arm. Terminally the abutment arm is formed as a flat-faced engagement surface 25 which can cover most or all of the end face of the pull knob 12. Proximately the segment is formed with two apertures 28, 29 (FIG. 3) through either of which, alternately, a pivot bolt 30 may be inserted to attach it to the adjacent end of the support arm 16 in an offcenter position so that the arm will normally gravitationally descend to the horizontal alignment shown in FIG. 3 where it is held by an edge lug 31. By use of the alternate aperture 29, the member 26 can be detached and inverted on a horizontal axis and reattached so that the transverse segment 32 of the "Z-shape" will be directed rearward rather than forward. Thus the arm 26 can be placed to straddle a forward ridge of the panel 10 or it can be used to accommodate staggered location of the mounting tab 14.

In the modification of FIGS. 5–6, the support arm 16a has an outturned bracket arm 36 which anchors one end of a flexible cable 37 which axially traverses a coil spring 38 with the other end of the cable fastened to an attachment tab 39 of a flat-faced abutment arm 40. The latter is slidable lengthwise in juxtaposition with the support arm, by means of an opposing edge pair of channel members 41, 42. Beyond its abutment face, the slide arm 40 is outturned to form a tab 43 used for manually retracting the arm against expansion tension of the spring so as to expose the knob 12 to be pulled out. Such tab can be pushed aside by the edge of the driver—s hand pressed against it, leaving his fingers free driver'grasp the knob 12.

The modification of FIGS. 7–8 provides a generally cylindrical stem-shaped abutment arm 48 which is mounted within a tubular support arm 49 in end abutment with a coil spring 50. An operating pin 51 projects radially from the stem through a guide slot 52 and enables the stem to be manually retracted against tension of the spring 50.

The construction of FIGS. 9–10 employs a pair of cylindrical, telescopic tubes 54, 55 of which the inner one 54 forms a support arm and internally houses a compression spring 53 which projects into the distal portion of the outer tube 55. The latter is closed by an end member or cap 57 which extends linearly to one side so as to provide a greater length of vertical abutment arm for contact with the pull knob 12. The cap is anchored by a cross pin 58 which along that stretch of its length which spans the interior of the tube chamber, has fastened to it the respective ends of an elongated wire loop 59. A corresponding, oppositely oriented wire loop 60 extends lengthwise within the cavity of the inner tube 54 with its midportion overlapping or being threaded through the outer loop 59 and its end portions passing through an opening of the base plate 56 and then bent oppositely to form anchorage arms 61, 62.

Accordingly it will be seen that the composite length of the two thus mutually/slidingly engaged loops 59, 60 limits the outward distance or separation that the outer tube 55 can move relative to the stationary tube 54, effected by expansion of the coil spring 59. On operational retraction of the outer tube 55 (so as to expose the pull knob 12 for manual grasping or extension), the elongated loop 59 disposed with its length rotated a quarter turn (more-or-less) relative to the longitudinal axis of the other loop 60, due to its semi-rigid nature will have its midportion moved lengthwise rearward within the open length of the base loop 60 and without frictional interference or other impediment.

I claim:

1. A motor vehicle automatic headlight turnoff switch assembly comprising:

a support arm having means at one end for attachment to an inner upstanding surface of a horizontally swingable vehicle door in position to locate the unattached end of said arm adjacent the operator's end of a headlight switch-rod which is longitudinally reciprocable between IN and OUT positions, the latter position serving to keep the headlights on, an abutment member carried by the unattached end of said support arm, being movable between alternate positions, (a) axially adjacent the end of the switch-rod when the latter is at IN position, so as to block the switch-rod being drawn to OUT position, and (b) laterally retracted therefrom so as to permit the switch-rod to be drawn to OUT position, said member being biased to normally occupy position (a) and thus automatically to assume such position upon the vehicle door being opened, whereby closing the door causes the abutment member to frictionally abut the switch-rod when OUT positioned and push it to IN position, thereby extinguishing the headlights operated by the switch-rod.

2. The switch assembly of claim 1 in combination with a motor vehicle having said switch assembly mounted on a vehicle door in position to operatively contact a longitudinally-reciprocable headlight-connected switch-rod of the vehicle.

3. A switch assembly according to claim 1 wherein said abutment member is pivotally secured to the support arm for generally vertical movement and is gravity-biased to assume position (a).

4. A switch assembly according to claim 1 wherein said abutment member is lengthwise displaceable along the support arm and is spring tensioned to assume position (a).

5. A switch assembly according to claim 3 wherein said abutment member is formed with a transverse offset length and coupling means whereby it may be pivotally secured to the support arm with the offset length alternately toward and away from the axis of the switch-rod when in position (a).

6. A switch assembly according to claim 4 wherein both said support arm and the displacement abutment arm are concentrically tubular 7. A switch assembly according to claim 6 wherein said tubular members are mutually telescopically engaged and disposed concentric with a compression spring and are restrained from further longitudinal separation beyond position (a) by an oppositely oriented pair of semi-rigid, elongated loops carried within the telescopic tubes, which loops are medially overlapped and each terminally fastened adjacent an opposite end of the respective tubes.

* * * * *

UNITED STATES PATENT OFFICE
CERTIFICATE OF CORRECTION

Patent No. 3,943,313   Dated March 9, 1976

Inventor(s) Aldo J. Carboni

It is certified that error appears in the above-identified patent and that said Letters Patent are hereby corrected as shown below:

In the title, "OFFICE" should read -- OFF --.

Column 2, line 38, "falt" should read -- flat --.

Column 2, line 40, "foward" should read -- forward --.

Column 3, line 13, "driver--s" should read -- driver's --.

Column 3, line 14, "driver's" should read -- to --.

Signed and Sealed this first Day of June 1976

[SEAL]

Attest:

RUTH C. MASON
Attesting Officer

C. MARSHALL DANN
Commissioner of Patents and Trademarks